United States Patent [19]
Broome

[11] Patent Number: 5,103,339
[45] Date of Patent: Apr. 7, 1992

[54] REAR PROJECTION SCREEN MULTI-PANEL CONNECTOR ASSEMBLY

[75] Inventor: Michael D. Broome, Greenfield, Ind.

[73] Assignee: Draper Shade & Screen Co., Inc., Spiceland, Ind.

[21] Appl. No.: 708,518

[22] Filed: May 31, 1991

[51] Int. Cl.⁵ .......................................... G03B 21/56
[52] U.S. Cl. .................................... 359/443; 359/449; 359/460
[58] Field of Search ............... 359/443, 449, 450, 453, 359/456, 459, 460; 52/281, 395

[56] References Cited

U.S. PATENT DOCUMENTS

| | | | |
|---|---|---|---|
| 3,841,045 | 10/1974 | Criswell | 52/395 |
| 3,992,841 | 11/1976 | Ward, Jr. | 350/117 |
| 4,254,600 | 3/1981 | Zwissler | 52/281 |
| 4,668,046 | 5/1987 | Yatabe et al. | 350/117 |
| 4,895,429 | 1/1990 | Iwahara et al. | 350/124 |
| 4,917,528 | 4/1990 | Shewchuk | 403/231 |
| 4,984,871 | 1/1991 | Martinez | 350/117 |
| 5,011,263 | 4/1991 | Hopper | 350/125 |

*Primary Examiner*—Richard A. Wintercorn
*Attorney, Agent, or Firm*—Baker & Daniels

[57] ABSTRACT

The invention comprises a multiple rear projection screen assembly which includes a plurality of rear projection screens and framing members between adjacent screens. Each screen has edges and a front and rear side, and are positioned in an adjacent relationship to form a contiguous viewing area such that each screen has at least one edge abutting the edge of an adjacent screen. Framing members are disposed along abutting edges of the screens with at least one of the framing members including a front bracket located along the front side of the abutting edges of two screens, and a rear bracket located along the rear side of the abutting edges of the two screens. The front bracket is spaced from the rear bracket and a fastener passes between the abutting edges of the screens. The fastener fastens the front bracket to the rear bracket such that the abutting edges of rear projection screens are simultaneously compressed between the front and rear brackets.

18 Claims, 4 Drawing Sheets

REAR PROJECTION SCREEN MULTI-PANEL CONNECTOR ASSEMBLY

FIELD OF THE INVENTION

This invention relates to rear projection screen systems, and, in particular, to framing systems for joining multiple adjacent rear projection screens.

BACKGROUND OF THE INVENTION

There are generally two types of projection screens used today. The first, and most common, is a front projection screen wherein the image is cast onto the screen from the same direction in which the image is viewed by an audience. The second type is a rear projection screen wherein the image is cast from the opposite, or rear, side of the screen relative to the location of the audience. In some applications of rear projection screens, more than one panel may be used to display several images or to display one large image as materials commonly used in the industry prohibit the manufacture of a sufficiently large single screen. In installations where multi-panel construction is desired, a framing system needs to be provided that connects adjacent screens without significantly reducing the viewing surface of each screen, minimizes the gaps between adjacent screens, prevents an image for one screen from overlapping onto an adjacent screen, and allows coplanar and angular orientations of adjacent screens. It is also desirable for such a framing system to be inexpensive, easy to install, easy to maintain, and capable of accommodating rear projection screens of various thicknesses and sizes.

Pre-formed frame assemblies are disclosed in U.S. Pat. Nos. 4,895,429, and 4,984,871. Such assemblies are used to join adjacent panels, or screens, of a particular size and at a specific angle with respect to each other. Frame assemblies in which each screen edge is placed in a U-shaped channel are difficult to install and to maintain. The frame can not be completely assembled before screens are placed in the frame, because, for each screen, the fourth U channel can be put into place only after the screen has been inserted in the first three U channels. Also, replacing a single screen in the middle of the multi-panel matrix requires that the side screens be first removed in order to gain access to the middle screen.

Other connectors, such as those disclosed in U.S. Pat. No. 4,895,429, require that fasteners, screws or bolts, be inserted through holes in the screens. Although these connectors are capable of accommodating a light-blocking fin to prevent the image intended to be displayed on one screen from being displayed on an adjacent screen, they do not allow for non-coplanar orientations of the front surfaces of the adjacent screens. They also require that dual fasteners, one through each screen, be utilized. The screen holes needed to accommodate the fasteners reduce the structural strength of the screen. Specifically, to avoid reducing the viewing surface of the screen, the holes required for the fasteners are made close to the edge of the screen which may weaken the edge and which may result in damage to the edge of the screen during assembly.

U.S. Pat. No. 4,668,046 discloses two other types of connectors used to join adjacent screens. One connector is limited to vertically join adjacent screens without a horizontal framing member above or below the vertically joined screens. A second connector includes holder plates secured to the ends of the screens and to a fin, which are, in turn, fastened to each other. This connector requires that a fin be utilized and also weakens the ends of the screens by the placement of many fasteners through the holder plates into the ends of the screen.

Other fasteners are disclosed in U.S. Pat. Nos. 3,841,045, 4,254,600 and 4,917,528.

OBJECTS OF THE INVENTION

Accordingly, it is one object of the invention to provide a multiple rear projection screen assembly that is inexpensive, easy to install, and which provides flexibility in maintaining the multi-panel construction.

Another object of the invention is to provide a multiple rear projection screen assembly that allows flexibility in the placement of adjacent screens.

It is another object of the present invention to provide a multiple rear projection screen frame assembly which can be utilized for a variety of sizes and weights of rear projection screens, and which minimizes the gap between adjacent screens to thereby maximize each screen's viewing area.

It still another object of the present invention to provide a multiple rear projection screen frame adjacent rear projection screens whose front surfaces are not coplanar.

It is another object of the present invention to provide a multiple rear projection screen frame assembly which allows flexibility in the number and location of fasteners required.

It is still another object of the present invention to provide a multiple rear projection screen frame assembly which minimizes weakening of the edges or ends of adjacent screens.

SUMMARY OF THE INVENTION

The invention comprises a multiple rear projection screen assembly which includes a plurality of rear projection screens and framing members between adjacent screens. Each screen has edges and a front and rear side, and are positioned in an adjacent relationship to form a contiguous viewing area such that each screen has at least one edge abutting the edge of an adjacent screen. Framing members are disposed along abutting edges of the screens with at least one of the framing members including a front bracket located along the front side of the abutting edges of two screens, and a rear bracket located along the rear side of the abutting edges of the two screens. The front bracket is spaced from the rear bracket and a fastening means passes between the abutting edges of the screens. The fastening means fastens the front bracket to the rear bracket such that the abutting edges of rear projection screens are simultaneously compressed between the front and rear brackets.

DETAILED DESCRIPTION

Figure 1:
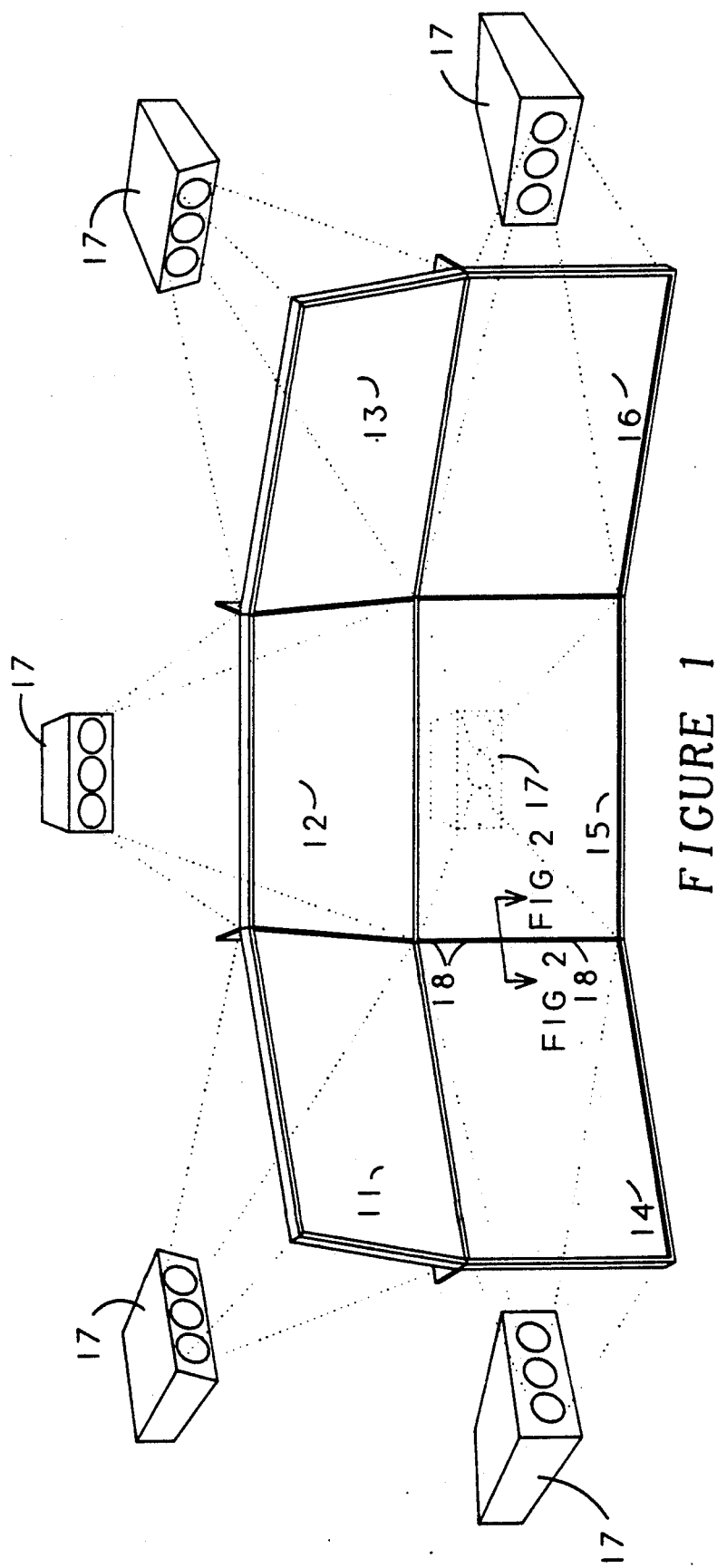
FIG. 1 shows a perspective view of one embodiment of the multiple rear projection screen assembly of the present invention.
Figure 2:
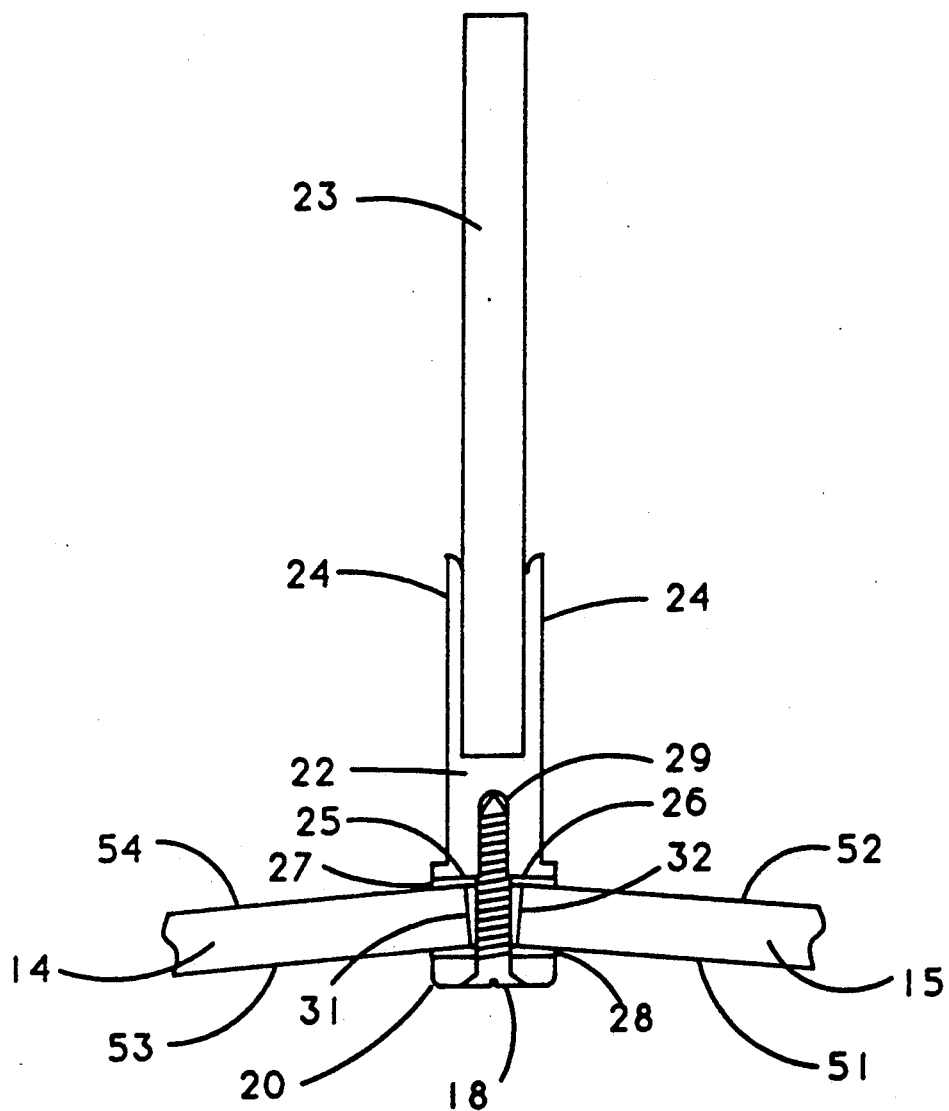
FIG. 2 shows a longitudinal cross-sectional view of the embodiment shown in FIG. 1 in which the rear projection screen frame assembly of the present invention is used to vertically join two adjacent rear projection screens.

Referring now to FIG. 1, there is shown a perspective view of the multiple rear projection screen assembly of the present invention. Rear projection screens 11-16 are positioned adjacent to each other to form a contiguous viewing area, and each screen has a least one edge abutting the edge of an adjacent screen. Projectors 17 each cast an image on the rear sides of screens 11-16. Those images are viewed on the opposing, or front, side of projection screens 11-16. In this embodiment, at least one of the framing members of the type shown in FIG. 2 is disposed along abutting edges of the screens. Fasteners 18 are visible from the front side of the projection screens 11-16.

Figure 3:
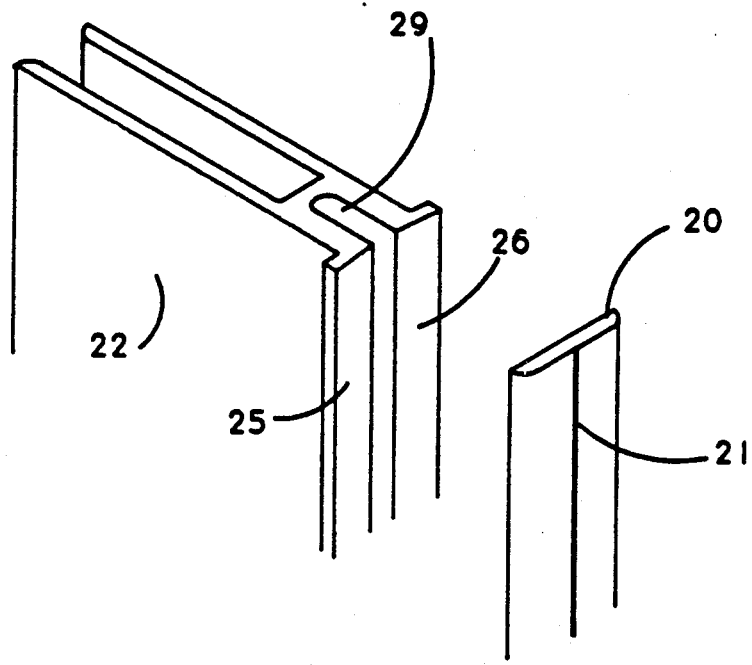
FIG. 3 shows a perspective view of the front and rear brackets of the embodiment shown in FIG. 2.

A longitudinal cross-sectional view of the multiple rear projection screen frame assembly according to the present invention is shown in FIG. 2. In this embodiment, projection screens 14 and 15 are vertically joined by the frame assembly which includes front bracket 20, rear bracket 22, and fastener 18. Both front bracket 20 and rear bracket 22 may be made from clear or bronze anodized aluminum, such as 6063-T5 aluminum, and may be formed by an extrusion process. A perspective view illustrating the details of the forms of the front and rear brackets 20, 22 is shown in FIG. 3. Front bracket 20 includes medial score 21 located on the front surface of front bracket 20. Medial score 21 serves as a guide for the placement of screws 18. Rear bracket 22, having a longitudinally extending body, includes longitudinally extending channel 29 within the body. Recessed channel 29 which comprises two parallel longitudinally extending sides and a tapered bottom and which provides a means for receiving multiple fastener means 18 at any point along the longitudinal length of recessed channel 29. The front surface of rear bracket 22 includes first and second screen engaging surfaces 25, 26 which, as illustrated in FIG. 2 are forwardly tapered from the median, or channel 29, of rear bracket 22. Rear bracket 22 also includes two longitudinally extending sides 24 which form a rectangular shaped channel into which backwardly extending light-blocking fin 23 can be placed. Fin 23, approximately three (3) inches by one-quarter ($\frac{1}{4}$) inch in cross-section as shown in FIG. 2, assists in preventing an image intended to fall on one screen from falling on an adjacent screen, and may be made from aluminum. In this embodiment, screen edge 31 of projection screen 14 abuts edge 32 of screen 15. As used herein and in the claims, "abutting" does not necessarily mean that the edges are touching each other (as a fastening means or connector may be disposed in between the adjacent screen edges), but means that the edges are in such a substantially close relationship that a contiguous viewing area appears when the two screens are viewed from a normal viewing distance.

Before assembly, high density foam gaskets 28, 27 with adhesive on one side are adhered to the rear surface of front bracket 20 and the front surface of rear bracket 22, respectively. Gaskets 27, 28 protect front 51, 53 and rear surfaces 52, 54 of rear projection screens 14, 15 from being scratched by front and rear brackets 20, 22, and also provide a means for a stronger, non-slip grip on projection screens 14, 15. Thus, first and second screen engaging surfaces 25, 26 may either be in direct contact with rear projections screens 14, 15 or may have a gasket 27 disposed between surfaces 25, 26 and screens 14, 15.

During assembly, screens 14, 15 are placed between front 20 and rear 22 brackets such that abutting edges 31, 32 are positioned to allow the passage of screw 18 between them. Apertures are drilled into medial score 21 at pre-determined locations and then fastening means 18 are screwed through the apertures in medial score 21 of front bracket 20, through gasket 28, between abutting edges 31, 32 of screens 14, 15, through gasket 27, and into recessed channel 29. Screws 18 may be countersunk such that they are flush with the front surface of front bracket 20.

It will be appreciated by those of skill in the art that fastener 18 provides a means for adjustable simultaneous compression between front 20 and rear 22 brackets and simultaneously compresses abutting edges 31, 32 of projection screens 14, 15. Screen engaging surfaces 25, 26 of rear bracket 22 are forwardly tapered from recessed channel 26 such that rear projection screens 14, 15 are not necessarily coplanar. If, for example, first and second screen engaging surfaces 25, 26 each have an offset of two and one-half (2.5) degrees, projection screens 14, 15 may be offset from each other at an angle of five (5) degrees. However, depending on the level of compression caused by the degree to which fastener 18 is tightened, offset angles different from five (5) degrees may be accommodated by the frame assembly.

Figure 4:
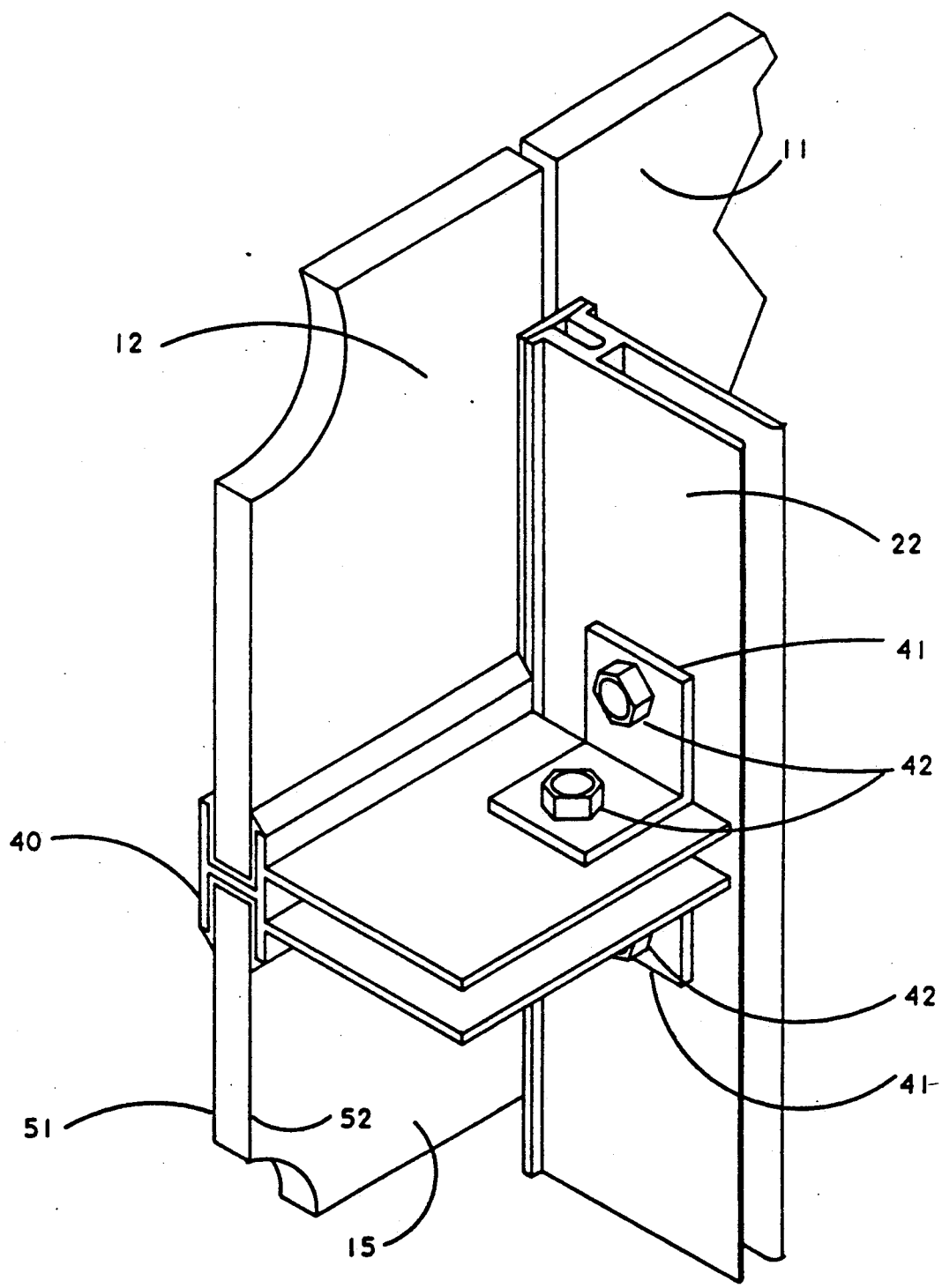
FIG. 4 shows another perspective view of the multiple rear projection screen assembly of FIG. 1.

Referring now to FIG. 4, there is shown a perspective view of the multiple rear projection screen assembly according to the present invention. Rear projection screens 11 and 12, and 14 (not visible) and 15 are vertically joined by the vertical member illustrated in FIG. 2. Horizontally, screens 12 and 15 are joined by horizontal member 40 which includes two U-shaped channels to provide a means for receiving abutting edges of adjacent screens, and a backwardly extending channel for receiving a light-blocking fin. Horizontal frame assembly 40 is joined to rear bracket 22 by L-brackets 41 affixed by fasteners 42 to both horizontal frame assembly 40 and rear bracket 22. Although not shown, it will be appreciated that the frame assembly of FIG. 2 disclosed herein may also be used as a horizontal frame assembly, depending on the weight of projection screens.

It will be appreciated by those of skill in the art that the multiple rear projection screen assembly of the present invention is inexpensive and easy to install while offering flexibility in the placement of adjacent screens. Furthermore, the screen frame assembly is comprised of few components and can be utilized for rear projection screens of varying thicknesses and weights. The location and number of fasteners required to support abutting edges of adjacent screens can be determined by the particular application, i.e., the size and weight of the screens as well as the geometric orientation of the screens. Also, the screen frame assembly accommodates a light-blocking fin used to prevent an image intended for display on a particular screen from being displayed on an adjacent screen.

It will be further appreciated that the multiple rear projection screen frame assembly of the present invention permits the frame to be constructed before being delivered to the installation site. Also, maintenance of the multi-panel system is quite simple and allows a screen in the middle of the matrix to be replaced without disassembling the entire frame assembly. The frame assembly also minimizes the gap between adjacent screens and, therefore, does not significantly reduce the viewing area of each screen. Finally, since no fasteners are placed through the edge or into the end of the screen, the structural strength of the screen is not reduced when using the disclosed frame assembly.

I claim:

1. A multiple rear projection screen assembly comprising:
a plurality of rear projection screens, each screen having edges and a front and rear side, the screens being positioned in an adjacent relationship to form a contiguous viewing area such that each screen has at least one edge abutting the edge of an adjacent screen,
a framing system comprising framing members disposed along abutting edges of the screens, at least one of the framing members comprising
a front bracket located along the front side of the abutting edges of two screens;
a rear bracket separate from the front bracket, the rear bracket located along the rear side of the abutting edges of the two screens;
the front bracket being spaced from the rear bracket; and
fastening means passing between the abutting edges of the screens, the fastening means fastening the front bracket to the rear bracket such that the abutting edges of rear projection screens may be simultaneously compressed between the front and rear brackets.

2. The multiple rear projection screen assembly of claim 1 wherein the fastening means provides adjustable compression between the front and rear brackets.

3. The multiple rear projection screen assembly of claim 1 wherein the front bracket includes a front surface and wherein the fastening means is flush with the front surface of the front bracket.

4. The multiple rear projection screen assembly of claim 1 wherein the front surfaces of at least two adjacent rear projection screens are not coplanar.

5. The multiple rear projection screen assembly of claim 1 wherein the framing members along abutting screen edges comprise backwardly extending light-blocking fins.

6. The multiple rear projection screen frame assembly of claim 1 wherein the rear bracket includes a recessed channel for receiving multiple fastener means, and further comprising multiple fastening means passing between the abutting edges of the screens, the fastening means fastening the front bracket to the rear bracket such that the abutting edges of rear projection screens may be simultaneously compressed between the front and rear brackets.

7. The multiple rear projection screen assembly of claim 1 wherein the framing system comprises horizontal members and vertical members, and wherein each vertical member comprises
a front bracket located along the front side of the abutting edges of two screens;
a rear bracket separate from the front bracket, the rear bracket located along the rear side of the abutting edges of the two screens;
the front bracket being spaced from the rear bracket; and
fastening means passing between the abutting edges of the screens, the fastening means fastening the front bracket to the rear bracket such that the abutting edges of rear projection screens may be simultaneously compressed between the front and rear brackets.

8. A multiple rear projection screen frame assembly for joining the adjacent edges of rear projection screens comprising:
a front bracket having a front and rear surfaces,
a rear bracket having at least one front surface;
the front bracket rear surface being spaced from the rear bracket front surface;
fastener means for connecting the front bracket to the rear bracket such that abutting edges of rear projection screens may be simultaneously compressed between the front and rear brackets.

9. The multiple rear projection screen frame assembly of claim 8 wherein the fastener means provides adjustable compression between the front and rear brackets.

10. The multiple rear projection screen frame assembly of claim 8 wherein the fastener means is flush with the front surface of the front bracket.

11. The multiple rear projection screen frame assembly of claim 8 wherein the front surface of the rear bracket includes a recessed channel for receiving multiple fastener means.

12. The multiple rear projection screen frame assembly of claim 8 wherein the front surface of the rear bracket includes a screen engaging surface, the screen engaging surface being forwardly tapered from its median.

13. The multiple rear projection screen frame assembly of claim 8 wherein the front bracket comprises a medial score on its front surface.

14. A multiple rear projection screen frame member for joining the adjacent edges of rear projection screens comprising:
a longitudinally extending body having first and second rear projection screen engaging surfaces;
a longitudinally extending channel within the body, the channel opening to the exterior of the body between the first and second rear projection screen engaging surfaces,
such that said frame member is adapted to receive a fastener in the channel at any point along its longitudinal length.

15. The multiple rear projection screen frame member of claim 14, wherein said member is formed by an extrusion process.

16. The multiple rear projection screen frame member of claim 14 wherein the channel is formed to receive a screw.

17. The multiple rear projection screen frame member of claim 14 wherein the channel comprises two parallel longitudinally extending sides and a tapered bottom.

18. The multiple rear projection screen frame member of claim 14 wherein the first and second screen engaging surfaces are forwardly tapered from the longitudinally extending channel.

* * * * *